United States Patent [19]

Bello et al.

[11] Patent Number: 4,546,421
[45] Date of Patent: Oct. 8, 1985

[54] FLYBACK FEEDFORWARD PULSE WIDTH MODULATION REGULATOR

[75] Inventors: Vincent G. Bello; Charles W. Sweeting, both of Norwalk, Conn.

[73] Assignee: United Technologies Corporation, Hartford, Conn.

[21] Appl. No.: 594,136

[22] Filed: Mar. 28, 1984

[51] Int. Cl.[4] .............................................. G05F 1/46
[52] U.S. Cl. ........................................ 363/21; 363/97; 323/288
[58] Field of Search ................. 363/21, 95, 97; 323/285, 288

[56] References Cited

U.S. PATENT DOCUMENTS

| | | | |
|---|---|---|---|
| 3,328,674 | 6/1967 | Bleicher | 323/22 |
| 3,541,420 | 11/1970 | Rees | 320/1 |
| 3,571,697 | 3/1971 | Phillips | 323/17 |
| 3,660,672 | 5/1972 | Berger et al. | 307/17 |
| 3,863,140 | 1/1975 | Easter et al. | 323/17 |
| 3,931,567 | 1/1976 | Kostecki | 323/9 |
| 4,034,281 | 7/1977 | Morita et al. | 323/17 |
| 4,131,843 | 12/1978 | Koyama et al. | 323/9 |
| 4,146,832 | 3/1979 | McConnell | 323/285 |
| 4,276,586 | 6/1981 | Boekhorst | 363/21 |
| 4,415,960 | 11/1983 | Clark, Jr. | 363/21 |

OTHER PUBLICATIONS

Girish C. Johari, *Loop Gain Behavior of Forward and Flyback Converters for Conventional and Modified Control Techniques*, Powerconversion International, Oct. 1962, p. 18.
Lloyd H. Dixon, Jr., *Pulse Width Modulator Control Methods with Complementary Optimization*, Powerconversion International, p. 14, Jan. 1982.
*Controller IC Sacrifices nothing to Improve Regulation*, Electronic Design, Jul. 8, 1982, p. 163.

Primary Examiner—Peter S. Wong
Assistant Examiner—Judson H. Jones
Attorney, Agent, or Firm—Robert P. Sabath

[57] ABSTRACT

A flyback feedforward circuit for a pulse width modulated DC power supply in which the duty cycle is determined by varying the slope and peak amplitude of the sawtooth waveform under the influence of a weighted sum of input and output voltages.

6 Claims, 4 Drawing Figures $$V_{out} = V_{in} \frac{t_{on}}{T}$$

CONTROL SIGNALS

EMITTER VOLTAGE

FLYBACK FEEDFORWARD PULSE WIDTH MODULATION REGULATOR

The Government has rights in this invention, pursuant to Contract No. FO-4704-C-0070 awarded by the Department of the Air Force.

CROSS REFERENCE TO RELATED APPLICATION

Cross reference is made to copending U.S. patent application Ser. No. 594,137, filed Mar. 28, 1984, having the title "Boost Feedforward Pulse Width Modulation Regulator", said invention having the same inventors as the instant application.

DESCRIPTION

1. Technical Field

This invention is directed toward the art of feedforward circuits and more particularly to the art of feedforward circuits for pulse width modulated regulators in DC power supplies.

2. Background Art

Pulse width modulation is a well known technique for DC voltage regulation, in which a constant output voltage is efficiently maintained despite wide variation in input voltage and output current. Voltage regulators employing pulse width modulation techniques are widely used in power supplies driving complex electronic systems.

There are various kinds of pulse width modulators, but generally speaking they all employ semiconductor switching to generate output rectangular voltage and current pulses which are effectively switched by an inductor-capacitor filter network to produce a constant output DC voltage level. The magnitude of the output voltage is controlled by the duty ratio of the semiconductor switch.

To maintain this output constant voltage level, a negative feedback arrangement is conventionally employed. This calls for a fixed fraction of the output voltage to be compared with a stable voltage reference, and developing an error signal which then effectively controls the duty ratio of the semiconductor switch.

The conventional switching power stage operates a transistor between on and off states, and smooths output pulses from the transistor to an average DC value which is a function of the on or off time. Smoothing the output pulses is accomplished by conventional filter circuitry which averages out the amplitudes of the switching pulses to produce a constant output voltage.

Feedback of an error signal is accomplished by an error amplifier and comparator operating at a nominal switching rate which is many times the power line frequency, for example in the vicinity of 20 kHz to 200 kHz. The error amplifier essentially operates to force the error signal to zero and force the output of the switcher (fed back through a resistor, for example,) to equal a reference voltage. When the output voltage of the switcher drops too low, the error amplifier turns on the switching transistor; when the output voltage rises too high, the switching transistor is turned off.

Reliable oscillation and regulation in these circuits are accomplished by either holding the pulse rate of the switcher constant and permitting only the pulse width (the "on" time) to vary; or holding the pulse width constant and permitting only the pulse rate to vary.

Switching regulators as discussed above can be implemented utilizing a series or shunt switching element, according to common knowledge in the art.

One way to obtain a variable pulse width is to compare the output of the error amplifier to a triangular wave, where the switching transistor on time is determined by the time that the triangular wave is less than the output of the error amplifier.

Although these circuits of the prior art are effective for many applications, the response time to variations in the input voltage is too slow. In many cases, the duty cycle of the switching transistor is thus too slow to compensate effectively for the change in input voltage.

Accordingly, it is an object of this invention to establish a switching regulator circuit arrangement which is effective for rapid response to input voltage fluctuations.

It is a further object of the instant invention to feed forward a portion of the input voltage in a switching regulator circuit arrangement in order to influence the duty cycle of the switching transistor of the arrangement toward enhanced responsiveness to changes in the input voltage.

It is another object of the instant invention to cancel the effect of an input voltage change in a switching regulator circuit arrangement.

DISCLOSURE OF INVENTION

The invention herein accomplishes the objects indicated above, including the establishment of more effective, swifter response to input voltage changes by feeding forward a portion of the input voltage to a critical point in the feedback network controlling the duty cycle of the switching transisitor.

In particular, the input voltage is fed forward to a point beyond the output of the error amplifier. The output of the error amplifier feeds to an input of the comparator, and the input voltage feeds through a selected resistor to combine with the output of another resistor connected to the output voltage, and to feed to another input of the comparator. The comparator compares the control voltage input from the error amplifier to the sawtooth voltage level as modified under the influence of both the input and output voltages, and outputs a signal to change the state of the switching transistor, whenever the level of the sawtooth waveform rises above or below the control voltage. If the control voltage against which the sawtooth is compared changes, the switching transistor "on" time changes, effectively changing the length of its duty cycle in order to keep the output voltage constant.

BRIEF DESCRIPTION OF DRAWING

The invention is best understood by reference to the drawing, which is in several figures, wherein.

BEST MODE FOR CARRYING OUT THE INVENTION

Figure 1A:
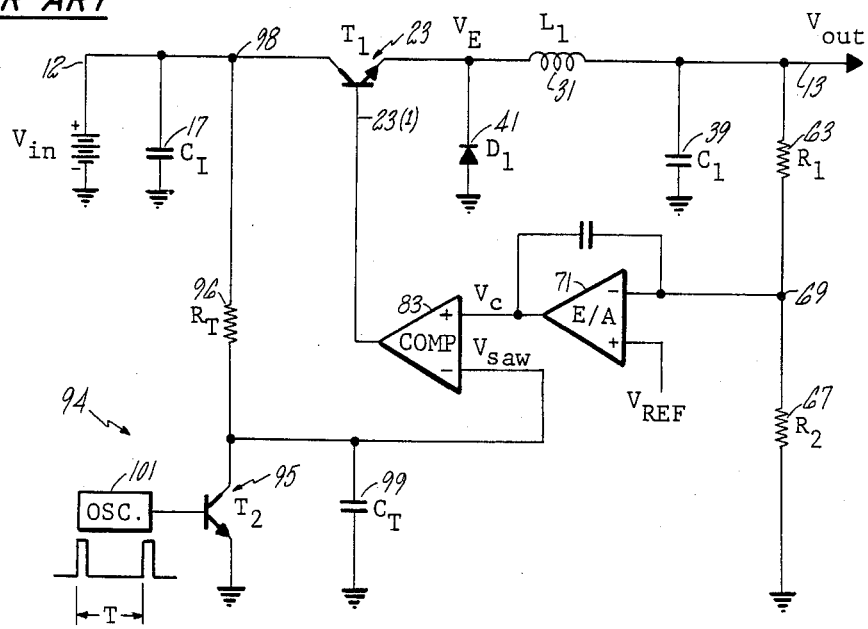
FIGS. 1A and 1B show respectively a buck feedforward circuit of the prior art, and associated voltage waveforms.
Figure 1B:
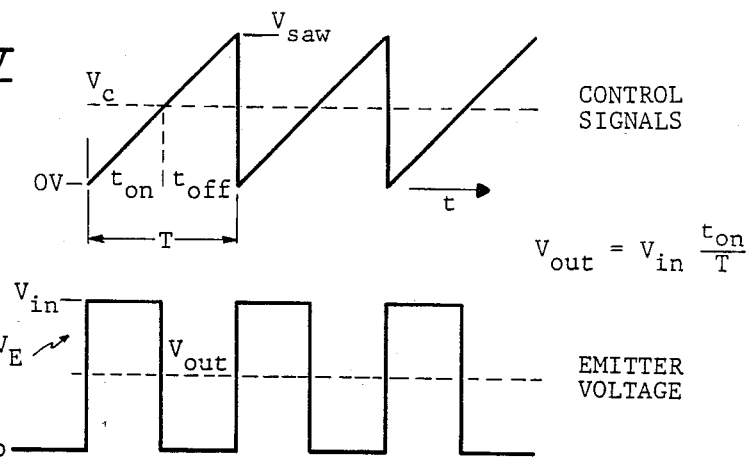

FIG. 1 shows a conventional buck feedforward circuit of the prior art for step-down voltage regulation between input and output terminals, respectively 12 and 13. The circuit includes an input capacitor 17 to filter input noise, which is connected to a suitable switching transistor 23.

The switching transistor 23 operates on a duty cycle to be discussed below, alternately switching between "on" and "off" states in accordance with a signal to its base or control side 23(1). The emitter output of the switching transistor 23, which in this case has been selected to be an "npn" transistor, is connected to an inductor 31, which in turn is connected to a capacitor 39 leading to ground. The output of the switching transistor 23 is additionally connected to the cathode of a diode 41 having a grounded anode.

When the switching transistor 23 is "on" and conducts, diode 41 is reverse biased and does not conduct. The current from the transistor 23 thus passes through inductor 31, charging capacitor 39 and passing to output 53.

When transistor 23 switches off, the inductor 31 maintains the current level existing while transistor 23 was "on". The inductor does so by drawing current from ground through now forward biased diode 41. Then as the current through the inductor 31 begins to diminish, capacitor 39 picks up and begins to supply the output 53 with a compensating level of current to maintain the output at substantially the same level.

The level of the output voltage at terminal 13 is monitored by a sampling or voltage divider network including in series to ground respectively resistors 63 and 67 with an output tap 69 therebetween. A selected portion of the output voltage is thus provided to an error amplifier 71 effective for comparing that portion of voltage with a reference voltage level.

The control voltage output of error amplifier 71 is fed to a comparator 83 which controls the switching of transistor 23 under direction of the error amplifier control voltage, $V_c$, from error amplifier 71, and a sawtooth voltage waveform produced by sawtooth generator 94 including an emitter grounded transistor 95, a resistor 96 to an input voltage connection 98, and ramp generating capacitor 99. The sawtooth voltage is created by sawtooth generator 94 acting upon a pulse pattern established by oscillator 101 feeding the base of transistor 95.

The output voltage from this conventional arrangement is that portion of the input voltage defined by the ratio of the time during which the switching transistor 23 is "on" to the period of the sawtooth waveform established by oscillator 101. Comparator 83 insures that transistor 23 is "on" whenever the output or control voltage of the error amplifier 71 exceeds the level of the sawtooth voltage waveform.

Correction for changes in the input voltage 98 is accomplished in the configuration of FIG. 1 by connecting the integrator resistor 96 to the input voltage rather than to a constant bias voltage. For a buck regulator, this causes essentially perfect correction with respect to input voltage changes. In such a buck regulator, the output voltage is proportional to the product of the input voltage and the on time for a constant period oscillator. By connecting resistor 96 to the input voltage, the saw amplitude and slope is made proportional to the input voltage, effectively forcing the on time to be inversely proportional to the input voltage, at a constant control voltage. Since the output voltage is directly proportional to the input voltage times the on time, which is now inversely proportional to the input voltage, any variation in the input voltage is completely and immediately cancelled, keeping the output voltage constant. This feedforward correction technique is well known and is not being claimed as part of the invention herein.

More particularly, feedforward correction for changes in the input voltage 98 is accomplished in the buck configuration by connecting the sawtooth generator resistor 96 to the input voltage. In a buck regulator the output voltage is proportional to the product of the input voltage and on time for a constant period oscillator, i.e., $$V_{out} = V_{in}\, t_{on}/T \tag{1}$$

where $V_{out}$ is the output voltage 13, $V_{in}$ is the input voltage 98, $t_{on}$ is the transistor switch 23 on time and T is the period of the oscillator 101 as shown in FIG. 1A. For exact feedforward the required on time is obtained from equation (1), giving:

$$t_{on} = T\, V_{out}/V_{in} \tag{2}$$

By connecting resistor 96 to the input voltage, the saw amplitude and slope is made proportional to the input voltage forcing the on time to be inversely proportional to the input voltage for a constant control voltage, $V_c$. From the control signal waveforms shown in FIG. 1 the on time is given by:

$$t_{on} = V_c\, T/V_{saw} \tag{3}$$

and the peak saw amplitude $V_{saw}$ is given by:

$$V_{saw} = V_{in}\, T/(R_T C_T) \tag{4}$$

The on time is then:

$$t_{on} = V_c\, (R_T C_T)/V_{in} \tag{5}$$

which is in the form required by equation (2), i.e., the on time is inversely proportional to the input voltage. Solving for the constants gives:

$$V_c\, R_T C_T = T\, V_{out} \tag{6}$$

For a desired period, output voltage and control voltage, the required sawtooth generator time constant $R_T C_T$ is given by equation (6). Since the output voltage is directly proportional to the input voltage times the on time (equation (1)) and the on time is now inversely proportional to the input voltage (equation (5)), any variation in the input voltage is completely and immediately cancelled, keeping the ouput voltage constant. This feedforward correction technique is well known and is not being claimed as part of this patent.

Figure 2A:
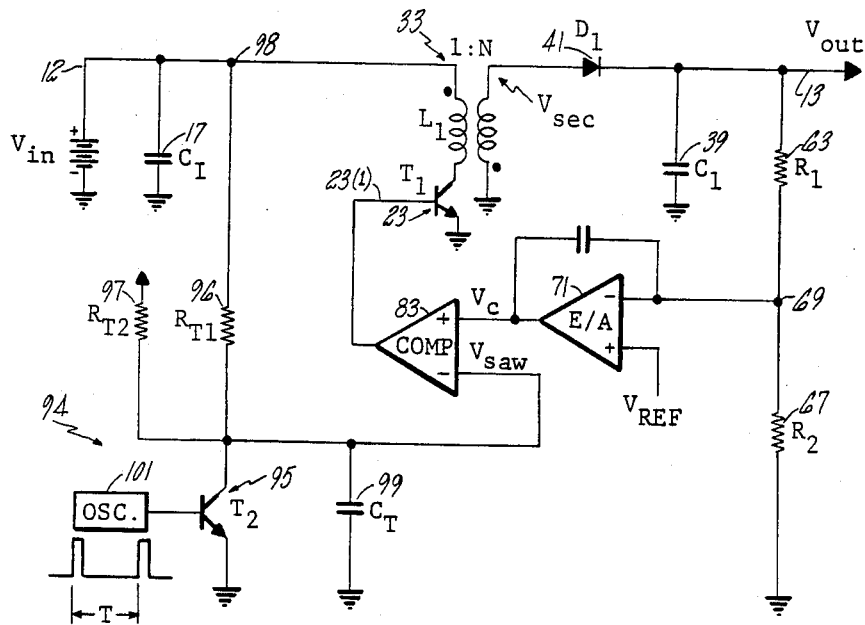
FIGS. 2A and 2B are respectively a flyback feedforward circuit arrangement in accordance with the invention, and voltage waveforms associated therewith.
Figure 2B:
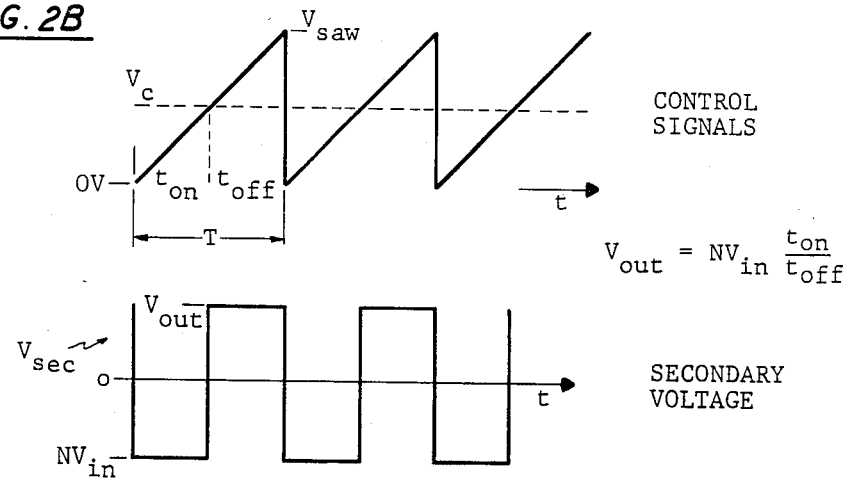

FIG. 2A shows a buck boost or flyback feedforward converter circuit according to this invention. The input voltage 98 of the invention is applied to an input side of the primary coil 31 of a transformer 33 having opposite polarity input and output coils. The other side of the primary coil is connected to switching transistor 23. The output voltage level is boosted by the turns ratio ("N") between the secondary and primary side of transformer 33, times the ratio of the on time to the off time.

The flyback converter circuit of FIG. 2A requires a different type of feedforward correction than the buck converter of FIG. 1 because the output voltage of the flyback converter is directly proportional to the input voltage, times the on time, and is inversely proportional to the off time for a constant period oscillator, i.e.

$$V_{out} = V_{in} t_{on}/t_{off} \quad (7)$$

for N=1, where $V_{out}$ is the output voltage, $V_{in}$ is the input voltage, $t_{on}$ is the on time of transistor switch 23 and $t_{off}$ is the off time of transistor switch 23 in FIG. 4. For exact feedforward, the required ratio of off time to on time from equation (7) is $$t_{off}/t_{on} = V_{in}/V_{out} \quad (8).$$

In order to essentially perfectly cancel variations in the input voltage, the feedforward correction according to the invention must make the ratio of the off time to the on time proportional to the input voltage. This is accomplished in the flyback converter by using resistor 96 connected to the input voltage and resistor 97, connected to the output voltage to establish a saw slope and peak amplitude proportional to a selected weighted sum of the input and output voltages, in proportion to the values of respective resistors 96 and 97.

Thus, when the input voltage increases, the ratio of the off time to the on time increases in direct proportion to the input voltage, given a constant level of control voltage $V_c$. From the control signal waveforms shown in FIG. 4B, the on time is given by:

$$t_{on} = V_c T/V_{saw} \quad (9).$$

Using $T = t_{on} + t_{off}$ gives $$t_{off}/t_{on} = V_{saw}/V_c - 1 \quad (10).$$

Substituting into equation (2) and solving for the required saw amplitude gives $$V_{saw} = (V_c/V_{out})(V_{in} + V_{out}) \quad (11).$$

The feedforward circuit shown in FIG. 4 gives the saw amplitude in exactly this form, i.e.

$$V_{saw} = (T/R_T C_T)(V_{in} + V_{out}) \quad (12)$$

where $R_{T1} = R_{T2} = R_T$. Solving for the circuit constants gives $$R_T C_T = T V_{out}/V_c \quad (13).$$

With these constants then the ratio of the off time to on time is made proportional to the input voltage, i.e., $t_{off}/t_{on} = V_{in} V_{out}$.

Since the output voltage is directly proportional to the input voltage divided by the ratio of the off time to the on time, and the ratio of the off time to the on time is directly proportional to the input voltage, any variation in the input voltage is essentially completely and immediately cancelled, keeping the output voltage constant. This feedforward technique for the flyback converter is considered novel as claimed herein.

The description above is likely to induce individuals skilled in the art to develop variations or related embodiments of the invention, which nonetheless fall within the scope thereof. Accordingly, reference to the claims which follow is urged, as these define with particularity the metes and bounds of the invention addressed herein.

We claim:

1. A feedforward circuit including a circuit input and a circuit output for a pulse width modulated DC power supply, comprising:
   transformer means for modifying current and voltage levels; including primary and secondary sides each including input and output sides;
   switching means including input, output and control sides, for passing power through said primary side in successive on and off states;
   diode means for transferring current with respect to said circuit outputs, said secondary side and said diode means being electrically connected in series, and said diode means being reverse biased during the on states of said switching means;
   capacitor means for storing charge, including respective output and grounded sides, the output side of said capacitor means being electrically connected at the circuit output;
   sampling means for sampling a selected portion of the output voltage at said circuit output;
   error means including an error output for establishing an error difference between said selected portion of said output voltage and a selected reference voltage;
   sawtooth means for establishing a sawtooth waveform of characteristic slope and peak amplitude;
   comparator means including sawtooth and error inputs and an output, for controlling the on and off times of said switching means with respect to the difference between the respective levels of said sawtooth and error inputs; and
   feedforward means for modifying the magnitude of the slope and peak amplitude of the sawtooth waveform, whereby said feedforward means is effective for precisely modifying the duty cycle of said switching means.

2. The method of establishing a feedforward circuit including a circuit input and output in a pulse width modulated power suply, including the steps of:
   (a) establishing a transformer means between said circuit input and output, for modifying current and voltage levels of said passed power, said transformer means including primary and secondary sides each including input and output sides;
   (b) periodically switching between on and off states of a switching means for passing power with respect to said primary side, including input, output and control sides in successive on and off states;
   (c) electrically connecting a diode means for transferring current with respect to said circuit output, said secondary side and said diode means being established in series, and said diode means being forward biased during the on states of said switching means;
   (d) electrically connecting a capacitor means for storing charge, including respective output and grounded sides, the output side of said capacitor means being electrically connected at the circuit output;
   (e) providing a sampling means for sampling a selected portion of the output voltage at said circuit output;
   (f) establishing an error means including an error output, for establishing an error difference between said selected portion of said output voltage and a selected reference voltage;
   (g) providing a sawtooth means for establishing a sawtooth waveform of characteristic slope and peak amplitude;

(h) establishing a comparator means including sawtooth and error inputs and an output, for controlling the on and off times of said switching means with respect to the difference between the respective levels of said sawtooth and error input; and (i) providing a feedforward means for modifying the magnitude of the slope and peak amplitude of said sawtooth waveform, whereby said feedforward means is effective for precisely modifying the duty cycle of said switching means.

3. The invention of claims 1 or 2, wherein the output of said comparator means is electrically connected to the control side of said switching means.

4. The invention of claims 1 or 2, wherein said sampling means includes a voltage divider circuit for determining the selected portion of said output voltage to be sampled.

5. The invention of claims 1 or 2, wherein said feedforward means includes first and second resistive means for modifying said sawtooth input level, respectively connected to said circuit input and circuit output on one side, and electrically connected to said sawtooth input on the other side.

6. The invention of claims 1 or 2, wherein said sawtooth means includes an oscillator for establishing a switching period.

* * * * *

UNITED STATES PATENT AND TRADEMARK OFFICE
CERTIFICATE OF CORRECTION

PATENT NO. : 4,546,421

DATED : October 8, 1985

INVENTOR(S) : Vincent G. Bello and Charles W. Sweeting

It is certified that error appears in the above-identified patent and that said Letters Patent is hereby corrected as shown below:

Column 1, line 6: after "Contract No." change "FO-4704-C-0070" to --F04704-79-C-0070--.

Column 6, line 39: after "power" change "suply" to --supply--.

Signed and Sealed this

Twenty-fifth Day of March 1986

[SEAL]

Attest:

DONALD J. QUIGG

Attesting Officer

Commissioner of Patents and Trademarks